United States Patent Office 3,337,186
Patented Aug. 22, 1967

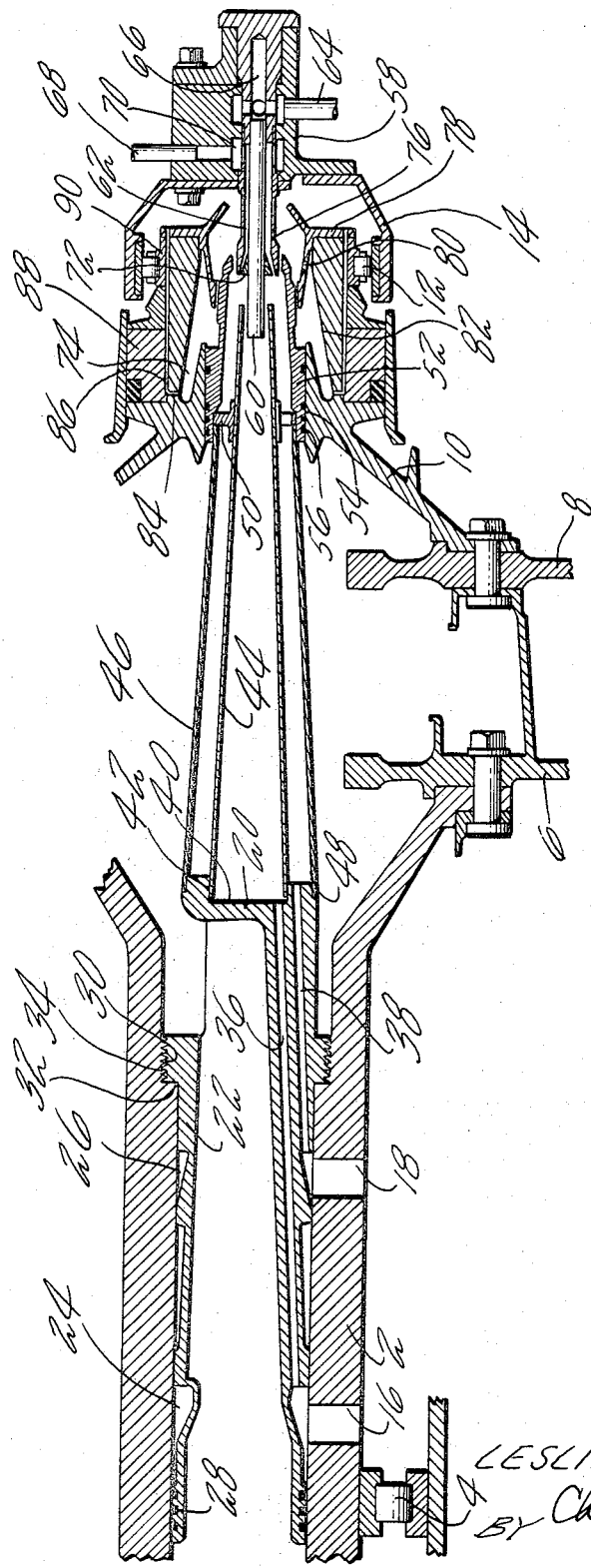

3,337,186
LIQUID SUPPLY TO A ROTATING SHAFT
Leslie C. Small, Jr., Glastonbury, Conn., assignor to United Aircraft Corporation, East Hartford, Conn., a corporation of Delaware
Filed Apr. 28, 1965, Ser. No. 451,590
11 Claims. (Cl. 253—39.15)

ABSTRACT OF THE DISCLOSURE

A fluid supply device for use in a hollow compressor rotor wherein the fluids to be supplied are transmitted through the interior of the hollow rotor without the transmitted fluids coming in contact with the entire hollow interior of the rotor. This avoids any change in the lubricating or cooling characteristics of the fluids which would result from the fluid coming in contact with the relatively hotter interior surfaces of the rotor.

This invention relates to a fluid supply means for use in transferring fluid from the open end of a hollow rotor to a point remote from the open end.

In the turbine of a gas turbine engine, the hollow turbine rotor is supported by a bearing upstream of the rotor at a point where lubricant cannot readily be supplied through the stationary support structure. This bearing and the adjacent seals also require cooling. One feature of the invention is the supply of fluid to this bearing by a device within the hollow rotor for delivery to the bearing through a radial passage in the rotor. Thus, more generally, one feature of the invention is the delivery of a fluid from an open end of a rotor, to a point within the rotor spaced substantially from the open end thereof for delivery through passages in the rotor, but without having this fluid in contact with the entire hollow interior of the rotor.

Another feature is the arrangement for a supply of two different fluids such as a lubricating fluid and a cooling fluid through a hollow rotor to suitable delivery passages in the rotor without mixing of the fluid and without either fluid contacting the hollow interior of the rotor. This is particularly important in gas turbines where the internal surfaces of the rotor may be hot enough in operation to affect the lubricating or cooling characteristics of the fluids.

One particular feature is a device that will accomplish this result and which is removable from the rotor for servicing.

Other features and advantages will be apparent from the specification and claims, and from the accompanying drawing which illustrates an embodiment of the invention.

The single FIGURE is a fragmentary longitudinal sectional view through the rotor and supporting structure embodying the invention.

The invention is shown in connection with a turbine rotor for a gas turbine engine although it will be understood that the invention has utility in other environments. As shown, the rotor has a hub or sleeve 2 journalled in a bearing 4 and this hub is bolted to spaced rotor discs 6 and 8. The disc 8 has attached to it an outer hub 10, the latter being supported by a bearing 12 within a stationary supporting structure 14.

It is desirable to supply two different fluids from the open end of the rotor to points within the rotor spaced substantially from the open end as, for example, the axially spaced radially extending ports or passages 16 and 18 in the hub 2. For example, the ports 16 may supply lubricant to the bearing 4 and the passages 18 may be used for a supply of cooling fluid or a fluid that may be used for sealing purposes. For the delivery of these fluids, which may in both cases be liquids under different pressures, the hub 2 has positioned therein a distributing device 20, the latter having a cylindrical portion 22 with spaced grooves 24 and 26 therein communicating with the passages 16 and 18 when the distributing device is in the position shown. At the end of the cylindrical portion remote from the open end of the rotor the cylinder carries seals 28 to prevent leakage between the hub and the cylinder 22. The distributing device has a threaded portion 30 adjacent to a shoulder 32 on the distributing device to cooperate with threads 34 within the hub 2 so that the distributing device can be threaded into the operative position shown.

Obliquely extending passages 36 and 38 extend from the grooves 24 and 26, respectively, substantially in parallel relation to one another and terminating adjacent the head 40 of the distributing device at points radially spaced from each other. The head 40 has a shoulder 42 which is concentric to the axis of the rotor and which supports the inner duct 44 of the two concentric and radially spaced ducts 44 and 46 which taper toward the open end of the rotor. The duct 44 engages with and is supported by the shoulder 42 which is radially outward of the open end of the passage 36 so that the liquid introduced into the duct 44 will be delivered to the passages 36 and thence to the radial passage 16. The duct 46, which is the outer of the two ducts, rests on the shoulder 48 which is radially outward of the passage 38 so that liquid introduced into the space between the ducts 44 and 46 will be delivered through the passage 38 to the radial passage 18. The increasing diameter of the rotating tubes as they approach the passages 36 and 38 will cause flow along the tubes by centrifugal force.

Adjacent the outer ends of the ducts 44 and 46 they are held in spaced relation to each other by a spider 50 supported on the inner duct and in engagement with the outer duct. The latter fits within a ring 52 which in turn is guided by a cylindrical surface 54 provided by the rotor. Suitable seals 56 prevent leakage between the ring 52 and the cylindrical guide and the outer end of the ring 52 extends axially beyond the outer end of the inner duct 44, as will be apparent.

Fluid is delivered to each of the ducts from a stationary device 58 attached to the stationary structure 14 and supporting a pair of concentric tubes 60 and 62. Fluid from a duct 64 is delivered to an axial passage 66 in the stationary device 58 and this passage receives the end of the tube 60. The tube 60 extends into the end of the rotor and into the outer end of the duct 44 so that fluid, which may well be lubricating oil, under pressure is discharged into the duct 44 and ultimately through the passages 36 and 16 reaches the bearing 4. Fluid from a duct 68 is delivered to a groove 70 within the stationary device 58 and the outer tube 60 communicates with the groove 70 so that fluid entering the duct 68 flows through the outer tube 62, that is to say, the space between this tube and the inner tube 60 and is discharged into the ring 52. It will be apparent that the end of the ring 52 overlaps the inner end of the tube 62. Suitable jets 72 may be formed in a closure flange at the inner end of the tube 62 so that the fluid discharging through these jets will be directed against the tapering inner surface 74 of the ring 52. Obviously, to accomplish this, the jets 72 are obliquely positioned. It will be apparent that with this arrangement two entirely different liquids may be delivered into the separate ducts 44 and 46 or, if desired, similar liquids at different pressures from different sources may be delivered to the respective ducts.

In addition to delivering fluid to the duct 44 the tube 62 may have a port 26 therein which discharges fluid into a ring 78 attached to the end of the rotor and the ring 78 carries a port 80 through which fluid discharged into the ring will flow onto a frusto-conical surface 82 on the rotor. Liquid on this surface is carried to a plurality of radial passages 84 in the rotor and thence into axial grooves 86 under a seal structure 88 and under the inner race 90 for the bearing 12 for cooling the seal and bearing race. By properly proportioning passages 76 and the jets 72, it will be apparent that the proper division of flow from the tube 62 may be established between the surface 82 and the outer duct 46.

It is to be understood that the invention is not limited to the specific embodiment herein illustrated and described, but may be used in other ways without departure from its spirit as defined by the following claims.

I claim:

1. Fluid supply means including a hollow rotor having an open end and at least two axially-spaced radially-extending passages therein at points spaced from the open end, stationary means located at the open end of the rotor for delivering two fluids into the rotor including concentric tubes extending into the open end of the rotor, the inner tube extending beyond the end of the outer tube, and a distributing device positioned in the rotor to direct the two fluids to the two passages respectively, said device including a hub positioned in the rotor adjacent the two passages and having spaced grooves in the outer surface communicating one with each passage in the rotor, axially extending passages in said hub from the grooves to the end of the hub, said axially extending passages terminating in radially spaced positions at the end of the hub, and concentric frusto-conical elements extending from the end of the hub to the ends of the tubes, the inner frusto-conical element extending to and surrounding the inner end of the inner tube and the outer element extending to and surrounding the outer tube, the inner end of the outer elements being secured to the hub for delivering the fluids therein to the respective passages in the hub.

2. A fluid supply means as in claim 1 in which the hub is threaded within the shaft.

3. A fluid supply means as in claim 1 in which the frusto-conical elements are concentric to the axis of the rotor and are held in concentric relation by the hub and by engagement between the outer element and the rotor adjacent the fluid delivery tubes.

4. A fluid supply means as in claim 1 in which the elements are concentric to the rotor axis and are held apart by spacer spiders positioned on the inner element and extending out to engage the outer element.

5. A fluid supply means as in claim 1 in which the outer tube has an inwardly extending flange at the end within the rotor to close the space between the tubes, and spaced orifices in said flange to meter the flow from this tube into the outer element.

6. Fluid supply means including a hollow rotor having a sleeve portion therein with axially-spaced radially-extending passages therethrough for the discharge of fluid out of the rotor, the end of the rotor remote from the sleeve being open, stationary means located at the open end of the rotor for delivering two fluids into the rotor including concentric tubes extending axially into the rotor along its axis, the inner tube extending beyond the end of the outer tube within the shaft, the inner tube carrying one fluid and the outer tube carrying another fluid, and a distributing device within the rotor for delivering the fluids from said tubes to said axially spaced passages respectively, said device having a hub portion axially slidable within the sleeve portion and having annular grooves in its periphery communicating respectively with the radial passages in the sleeve portion, said device also having coaxial tapering ducts therein extending from the tubes to the hub portion, said ducts being concentric to the rotor axis, the end of said inner duct surrounding the inner fixed tube and the end of the outer duct surrounding and receiving fluid from the outer tube, said tapering ducts increasing in diameter from the ends adjacent the tubes to the hub ends thereof, and obliquely positioned passages in said hub portion from the ducts to the grooves in the hub portion, one obliquely positioned passage extending from the inner duct to one of the grooves and the other obliquely positioned passage extending from the space between the tapered ducts to the other groove in the hub portion.

7. A fluid supply means as in claim 6 in which the outer duct is supported on the rotor at the end adjacent the tubes.

8. A fluid supply means as in claim 6 in which the ducts are held in spaced relation adjacent the tube ends by a spider positioned therebetween and the outer duct is supported in the rotor adjacent this end.

9. A fluid means as in claim 6 in which the rotor and hub portion have cooperating threaded engagement to retain the device within the rotor.

10. Fluid supply means including a hollow rotor having a sleeve portion therein with a radially extending fluid discharge passage therein, the end of the rotor remote from the sleeve portion being open, a hub within the sleeve portion having threaded engagement with the rotor, said hub having a peripheral groove in alignment with the passage, a tapered tube extending from the hub to the open end of the rotor, said tube decreasing in diameter toward said open end of the rotor and being concentric to the rotor axis, a duct in the hub from the tube to the peripheral groove, and a stationary tube supported externally to the rotor and extending into the open end thereof and into the end of the tapered duct for delivery of fluid into said duct.

11. A fluid supply means as in claim 10 in which the end of the tapered tube adjacent the open end of the rotor is supported concentrically thereto by a part of the rotor.

References Cited

UNITED STATES PATENTS

| | | | |
|---|---|---|---|
| 2,636,665 | 4/1953 | Lombard | 253—39.15 X |
| 2,951,337 | 9/1960 | Atkinson et al. | 184—6 X |
| 3,075,349 | 1/1963 | Bill et al. | 184—6 X |

MARTIN P. SCHWADRON, *Primary Examiner.*

EVERETTE A. POWELL, Jr., *Examiner.*